United States Patent [19]

Leone et al.

[11] 4,124,220
[45] Nov. 7, 1978

[54] LUBRICANT SEALS

[75] Inventors: Miguel A. Leone, Anchorena 880, Olivos, Buenes Aires, Argentina; Americo Castellani, Buenos Aires, Argentina

[73] Assignee: Miguel A. Leone, Buenos Aires, Argentina

[21] Appl. No.: 750,690

[22] Filed: Dec. 15, 1976

[30] Foreign Application Priority Data

Dec. 29, 1975 [AR] Argentina ............................... 261792

[51] Int. Cl.² .......................... F16J 15/52; F01M 9/10
[52] U.S. Cl. ............................... 277/162; 123/188 P; 123/188 GC; 184/6.9
[58] Field of Search ................. 123/188 GC, 188 VA, 123/188 P, 188 AF, 90.37; 184/6.9, 24; 277/162, 48, 32

[56] References Cited

U.S. PATENT DOCUMENTS

| | | | |
|---|---|---|---|
| 2,859,993 | 11/1958 | Estey | 123/188 P |
| 2,860,615 | 11/1958 | Mayes | 123/188 P |
| 2,906,255 | 9/1959 | Bunce | 123/188 P |
| 3,326,562 | 6/1967 | Deuring | 123/188 P X |
| 3,333,578 | 8/1967 | Muller | 123/188 P |
| 3,480,286 | 11/1969 | Kosatka | 123/188 P X |
| 3,498,621 | 3/1970 | Wilson | 277/162 X |
| 3,599,992 | 8/1971 | Kammeraad | 123/188 P X |
| 3,601,420 | 8/1971 | Binford | 123/188 P X |
| 3,788,295 | 1/1974 | Toth | 184/6.9 X |
| 3,885,546 | 5/1975 | Foley et al. | 123/188 P |

*Primary Examiner*—David H. Brown

[57] ABSTRACT

A lubricant seal is provided for use in the lubrication of rotating or reciprocating members which are subject to very severe ambient conditions, such as the stems of inlet or exhaust valves of internal combustion engines. The lubricant seal comprises a tubular member of elastomeric material having a first portion surrounding the movable member and a second portion that fits tightly on a bushing guiding the movable member. The first and second portions are connected by a flexible bellows element which compensates any misalignment between the movable member and the bushing. A metering ring made of a self-lubricating material is anchored in the first portion of the tubular member and has a bore closely fitting the periphery of the movable member. An oil accumulating receptacle is defined on the exposed face of the metering ring and capillary passages are provided in the ring which permit the self-controlled and metered flow of lubricant through the ring and into the space between the movable member and the bushing.

11 Claims, 3 Drawing Figures

LUBRICANT SEALS

BACKGROUND OF THE INVENTION

The present invention relates generally to lubricant seals, and more particularly refers to a lubricant seal which permits the controlled leakage of lubricant fluid therethrough.

The invention is intended for use in the lubrication of rotating or reciprocating members which are subject to very severe ambient conditions, i.e. where very high temperatures or abrasive environments are involved, and is specially designed for lubricating valve stems in internal combustion engines.

As it is well known, the valves used in internal combustion engines control communication of the intake or exhaust manifolds with the combustion chamber, in which temperatures of 1000° C. and more are developed. Since any lubricant oil exposed to such temperature would inevitably burn, seals have been used in the past to prevent the lubricant from passing into the combustion chamber.

However, the known seals block almost completely the leakage of lubricant oil therethrough and, as a consequence, it has been the general practice to provide a substantial clearance between the valve stems and the respective bushings to avoid the possibility of seizures due to the different expansion rates of the stems and bushings, and the virtual absence of lubrication in the lower portion of the stems. These relatively large clearances and the premature wear of the bushings due to the lack of proper lubrication eventually caused knocking and an irregular and unreliable operation of the engine.

SUMMARY OF THE INVENTION

In view of the above difficulties, it is a main object of the invention to provide a lubricant seal which allows the passage of lubricant therethrough in a self controlled and dosified manner depending on the requirements of the parts in relative motion.

A more particular object of the invention is to provide a lubricant seal having the above mentioned characteristics, for the valve stems of internal combustion engines, whereby closer clearances could be used between the stems and the respective bushings and, at the same time, enable the lubrication of the stems in their entire effective length.

Another object of the invention is to provide a lubricant seal having means for compensating any misalignment or eccentricity between the movable member and the bushing.

Other objects and advantages of the invention will become apparent in the course of the following description, in which reference will be made to the accompanying drawings showing a preferred embodiment of the invention as applied to a valve stem. Other applications of the invention are nevertheless possible and will be readily envisioned by those expert in this art.

DESCRIPTION OF THE PREFERRED EMBODIMENT

Figure 1:
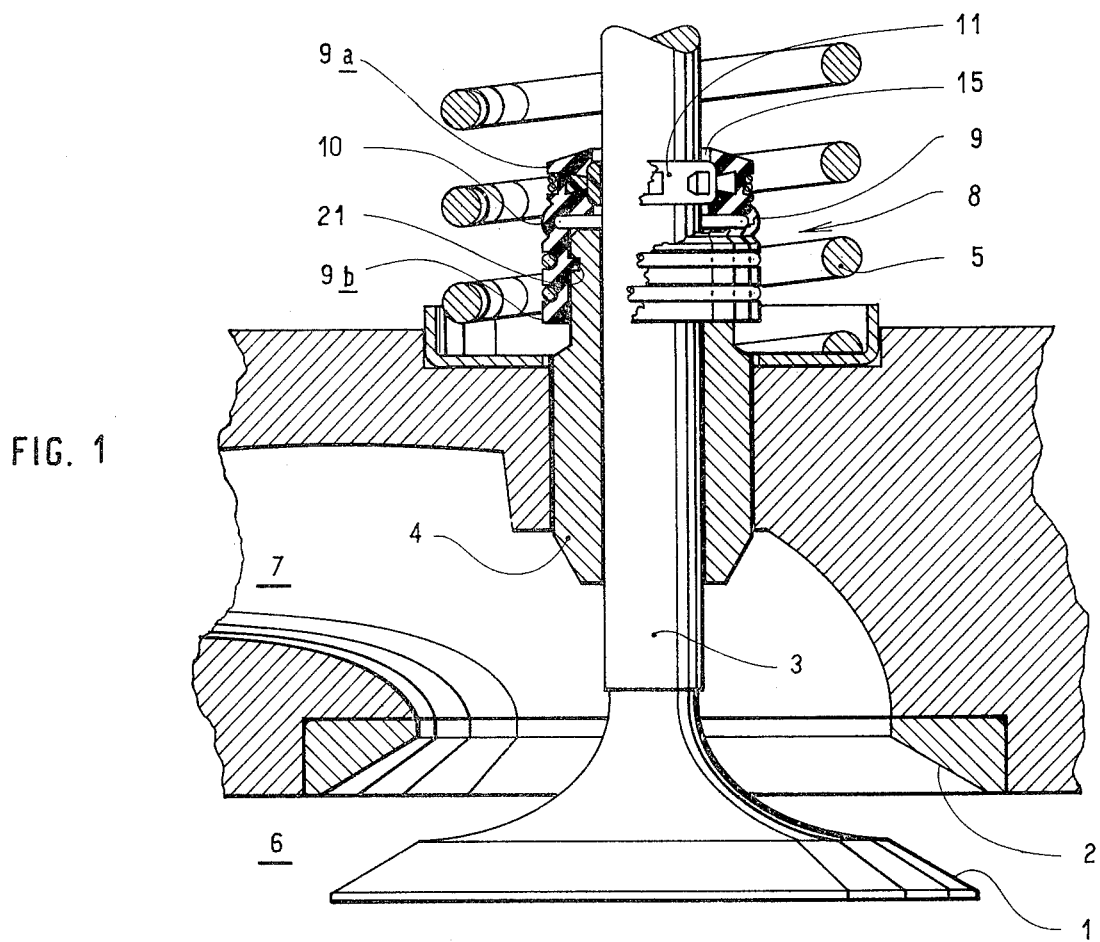
FIG. 1 illustrates somewhat schematically and partially in section, the area corresponding to an inlet or exhaust valve of an internal combustion engine and shows the installation of a lubricant seal in accordance with the invention.
Figure 2:
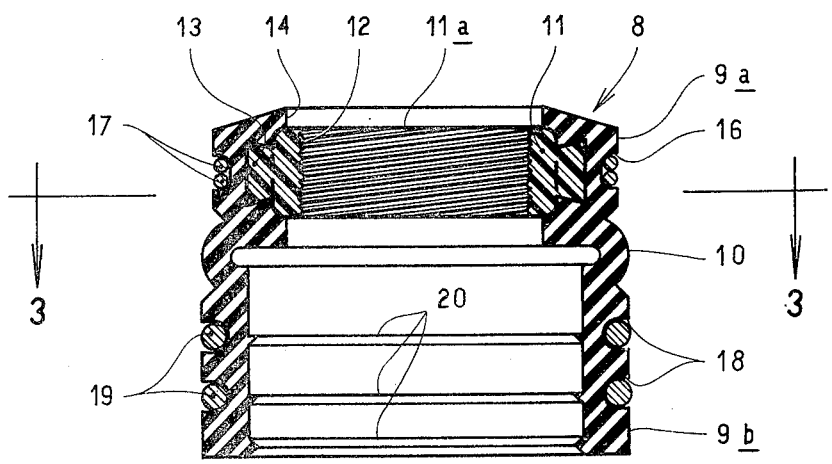
FIG. 2 is a longitudinal section of the lubricant seal of the invention, at an enlarged scale.

As shown in FIG. 1, a typical valve of an internal combustion engine, whether an inlet or an exhaust valve, comprises a conical surface 1, adapted to rest on a valve seat 2, and a cylindrical stem 3, slidably mounted in a bushing 4. The free end of the valve stem is connected to a tension spring 5 which normally urges the valve towards its closed position.

The valve is opened or closed, in accordance with the requirements of the engine cycle, by means of a rocker arm (not shown) which engages the free end of the valve stem and is, in turn, actuated by a cam shaft (not shown). Thus the valve establishes or interrupts communication between the combustion chamber 6 of the engine and the inlet or exhaust passage 7.

As previously mentioned, the temperature within the combustion chamber and in the adjacent area of the engine, is extremely high, and in the prior art, seals or other barriers were provided in the inlet valve to prevent the lubricant oil from being sucked through the clearance between the valve stem and the bushing and into the combustion chamber since otherwise, this lubricant would burn producing carbon deposits on the cooperating surfaces.

The seals installed in the exhaust valves were intended to avoid the dripping of oil through the clearance between the valve stem and the bushing and also the escape of exhaust gases through said clearance.

On the other hand, in view of the difficulty in lubricating the cooperating surfaces of the valve, bushing and the valve stem, it was common practice to provide a substantial clearance therebetween in order to avoid the possibility of seizure, due precisely to a defficient lubrication.

In accordance with the present invention, there is provided a lubricant seal, indicated with the reference numeral 8, which includes a tubular member 9 of elastomeric material. The tubular member comprises a first portion 9a having a bore loosely surrounding the valve stem 3 and defining an annular chamber therewith, and a second portion 9b having a bore tightly fitting and in sealing engagement with the outer surface of the bushing 4. These first and second portions are joined by a flexible bellows element 10 forming an integral part of the tubular member and which permits compensating any misalignment or eccentricity between the valve stem and the outer surface of the valve bushing.

The tubular member 9 is preferably made of synthetic rubber such as silicone rubber, polyakryl rubber, or the like.

A rigid metering ring 11 is provided in the first or upper portion 9a of the tubular member 9.

This ring is made of self-lubricating material, such as tetrafluoroethylene polymer (commercially known under the trade name "Teflon"), and its inner diameter or bore corresponds to the diameter of the valve stem 3.

Capillary passages are provided on the inner surface or bore of the metering ring 11 which in the preferred embodiment of the invention consist of one or more capillary grooves 12 inclined with respect to the axis of the valve stem.

The grooves 12 have capillary dimensions, but have been shown greatly exaggerated for the sake of clarity.

Preferably the capillary grooves are substantially triangular or trapezial in cross section and can be made with a twist or straight fluted tap.

Figures 3, 4:
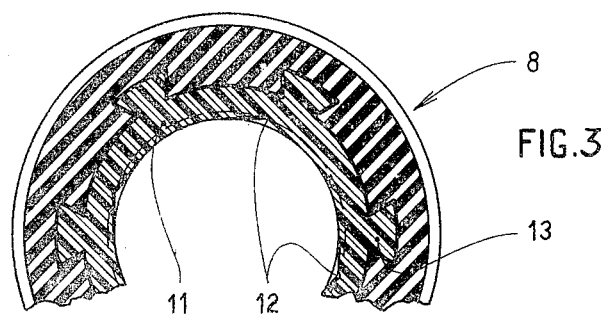
FIG. 3 is a section taken along line 3—3 of FIG. 2.
FIG. 4 is a vertical cross-sectional view of a metering ring which may be utilized in the lubricant seal of the invention.

However, such passages may adopt other forms, such as a multiplicity of interconnected pores provided in the ring structure such as shown in FIG. 4.

The ring 11 has anchoring means, which in the embodiment shown in the drawings comprise a series of dove-tail shaped lugs 13 distributed around the outer periphery of the ring and which are embedded in the tubular member 9. The bore in the first portion 9a of the tubular member has an outer edge or lip 14 and the metering ring 11 has an exposed surface 11a recessed with respect to said outer edge. Thus, an open-top, annular lubricant receptacle or well 15 is defined by the exposed surface 11a of the ring, the surface of the valve stem 3, and the outer edge 1r of the tubular member. The purpose of this receptacle will be explained subsequently.

The first or upper portion 9a of the tubular member has a peripheral groove 16 in which a retaining helical spring 17 is mounted. This retaining spring 17 preferably has two loops and exerts radial forces to hold firmly the metering ring 11 in position.

The outer surface of said second or lower portion 9b has two peripheral grooves 18 in which two retaining spring clamps 19 are mounted in order to hold firmly said second or lower portion to the valve bushing.

The helical spring 17 or the spring clamps 19 could obviously be replaced by other types of retaining means.

The outer surface of the valve bushing 4 has one or more peripheral grooves 21 which are arranged so that the adjacent area of the tubular member 9 is deformed by the encircling spring clamps 19 and firmly grips the groove 21 and assists in holding the tubular member in sealing engagement with the bushing 4.

The bore in the second or lower portion 9b has three circumferential lips 20 which serve to wipe oil residues from the outer surface of the valve bushing when the seal is initially mounted thereon.

OPERATION

The operation of the arrangement which has been described is as follows: Lubricant oil wiped by ring 11 as a consequence of the reciprocating movement of the valve stem, or dripping from the cam shaft and associated mechanisms, is retained in the upper receptacle 15 which acts as a reservoir, and part of the retained oil passes through the capillary grooves 12 and lubricates the surface of the valve stem below the ring 11.

The flow of lubricant through the ring 11 is a function of the temperature of the stem, since viscosity is inversely proportional to temperature. Besides ring 11 has a coefficient of expansion higher than that of the metal of which the valve stem is made, and such differential expansion allows an increased flow of lubricant as the temperature of the valve increases.

Thus, the system is self-regulating and feeds lubricant at the required rate. Consequently, it is possible to diminish the clearance between the valve stem and the bushing to the minimum required for a proper relative sliding motion and extend the useful life of these parts.

In the embodiment shown in the drawings, the capillary grooves in the metering ring consist of a female capillary thread of triangular cross section having four leads. However, the pitch, number of leads or size of the capillary grooves (in other words the effective length and cross section of said capillary grooves) depend on the viscosity of the lubricant oil used and the operative conditions of the engine, particularly the pressure ratios between the cam shaft chamber and the exhaust passage, or the cam shaft chamber and inlet passage. These pressure ratios are usually charted for a given engine.

In the case of inlet valves, satisfactory results have been obtained with metering rings having a capillary, helical thread of triangular cross section, approximately 0,2 mm wide by 0,2 mm deep, with 1–5 leads.

For exhaust valves, good results were obtained with metering rings having a capillary, helical thread of triangular cross section, approximately 0,4 mm wide by 0,4 mm deep, with 1–5 leads.

The "wide" and "deep" dimensions correspond to the base and height of the triangular cross section respectively.

In the examples given, regular automobile oil, SAE 40, was used.

Although the capillary grooves are preferably of helical configuration, they may also be straight and parallel to the axis of the valve stem.

Acceptable results have also been obtained with metering rings having a porous structure.

It is to be understood that many alternatives, modifications and variations will be apparent to those skilled in the art in the light of the aforegoing description. Accordingly, it is intended to embrace all such alternatives, modifications and variations which fall within the spirit and scope of the appended claims.

We claim:

1. A lubricant seal for a cylindrical member to be mounted for relative movement in a bushing, the seal comprising a tubular member formed of elastomeric material and including a first portion having a first axially extending bore dimensioned so as to loosely surround the cylindrical member to be sealed when positioned thereabout, a second portion having a second axially extending bore dimensioned so as to tightly fit the bushing and in sealing engagement therewith when positioned thereon, and a flexible bellows forming an integral part of the tubular member and joining said first and second portions in order to compensate for any misalignment between the cylindrical member and the bushing; said first bore having an upper annular edge; a metering ring formed of a rigid non-metallic self lubricating material having a coefficient of expansion substantially higher than that of metal anchored in said first portion in a manner permitting radial expansion; said ring having a bore dimensioned to closely fit the cylindrical member and having an exposed upper surface projecting radially inwardly of said upper annular edge and therebelow, and at least one capillary passage in said ring opening at the surface of said bore, whereby lubricant oil collected in an open annular receptacle defined by said exposed upper ring surface, said upper annular edge of said first portion and by the adjacent surface of the cylindrical member when mounted in the bushing flows in a self-controlled and metered manner through the capillary passage and into the space between the cylindrical member and the bushing.

2. A lubricant seal as claimed in claim 1 wherein said capillary passages are a multiplicity of interconnected pores in the structure of the ring.

3. A lubricant seal as claimed in claim 1 wherein said metering ring is made of tetrafluoroethylene.

4. A lubricant seal as claimed in claim 1 wherein said tubular member is made of synthetic rubber.

5. A lubricant seal as claimed in claim 1 wherein spring means surround said first and second portions of the tubular member for respectively holding said ring in place and for attaching securely said second portion to the bushing.

6. A lubricant seal as claimed in claim 1 wherein the bore of said second portion has at least one circumferential lip on its surface.

7. A lubricant seal as claimed in claim 1 sherein said metering ring has on its outer periphery a plurality of anchoring lugs embedded in said first portion of the tubular member.

8. A lubricant seal as claimed in claim 1, wherein said clyindrical member is the valve stem of an inlet or exhaust valve of an internal combustion engine; said first portion of the tubular member is arranged above said second portion; said receptacle having an open top; said ring having one or more capillary grooves on its bore and being made of a material having a higher expansion rate than the expansion rate of the valve stem; said ring having on its outer periphery a plurality of anchoring lugs embedded in the first portion of the tubular member; and said second portion of the tubular member having at least one circumferential lip on the surface of the second bore.

9. A lubricant seal as claimed in claim 1, wherein said tubular member has a downwardly and outwardly sloping top surface which intersects said first bore at an acute angle.

10. A lubricant seal as claimed in claim 1 wherein said capillary passages are grooves on the bore of the metering ring.

11. A lubricant seal as claimed in claim 10, wherein said capillary grooves are at an angle with respect to the longitudinal axis of the metering ring.

* * * * *